United States Patent [19]

Eisenberg et al.

[11] 4,239,116
[45] Dec. 16, 1980

[54] APPARATUS FOR DIVERTING ARTICLES

[75] Inventors: Bernard C. Eisenberg, Rockaway; John C. Walz, Bloomfield, both of N.J.

[73] Assignee: Solbern Corp., Fairfield, N.J.

[21] Appl. No.: 955,202

[22] Filed: Oct. 27, 1978

[51] Int. Cl.$^3$ ............................................. B07C 9/00
[52] U.S. Cl. .................................... 209/523; 209/918; 198/351; 250/223 B
[58] Field of Search .............................. 209/522–533, 209/918; 198/351, 354; 250/223 B

[56] References Cited

U.S. PATENT DOCUMENTS

| | | | |
|---|---|---|---|
| 3,064,807 | 11/1962 | Stover | 209/529 |
| 3,259,240 | 7/1966 | Schneider | 209/523 |
| 3,327,848 | 6/1967 | Barnhart et al. | 209/531 |
| 3,351,198 | 11/1967 | Wyman | 209/528 |

*Primary Examiner*—Joseph J. Rolla
*Attorney, Agent, or Firm*—Kenyon & Kenyon

[57] ABSTRACT

Apparatus and method for diverting articles being moved by a conveyor in a line extending along a predetermined path to at least one additional conveyor moving along at least one additional path extending from a diverting station located adjacent to the first path. A different diverting signal corresponding to each additional path can be generated, causing a diverter to switch a given article to a selected additional path. The diverters includes a plurality of engaging devices supported in spaced relation and driven in a closed path that is adjacent to the conveyor at the diverting station. The engaging devices are programmed in response to corresponding diverting signals to divert specific articles on the conveyor by enabling assemblies at an enabling station located along the closed path ahead of the diverting station. The diverting signals may be generated as each article passes a sensing station located along the predetermined path ahead of the diverting station. The engaging devices are driven in synchronism with the conveyor so that each enabled engaging device arrives at the diverting station coincidentally with the arrival of the corresponding article.

10 Claims, 7 Drawing Figures

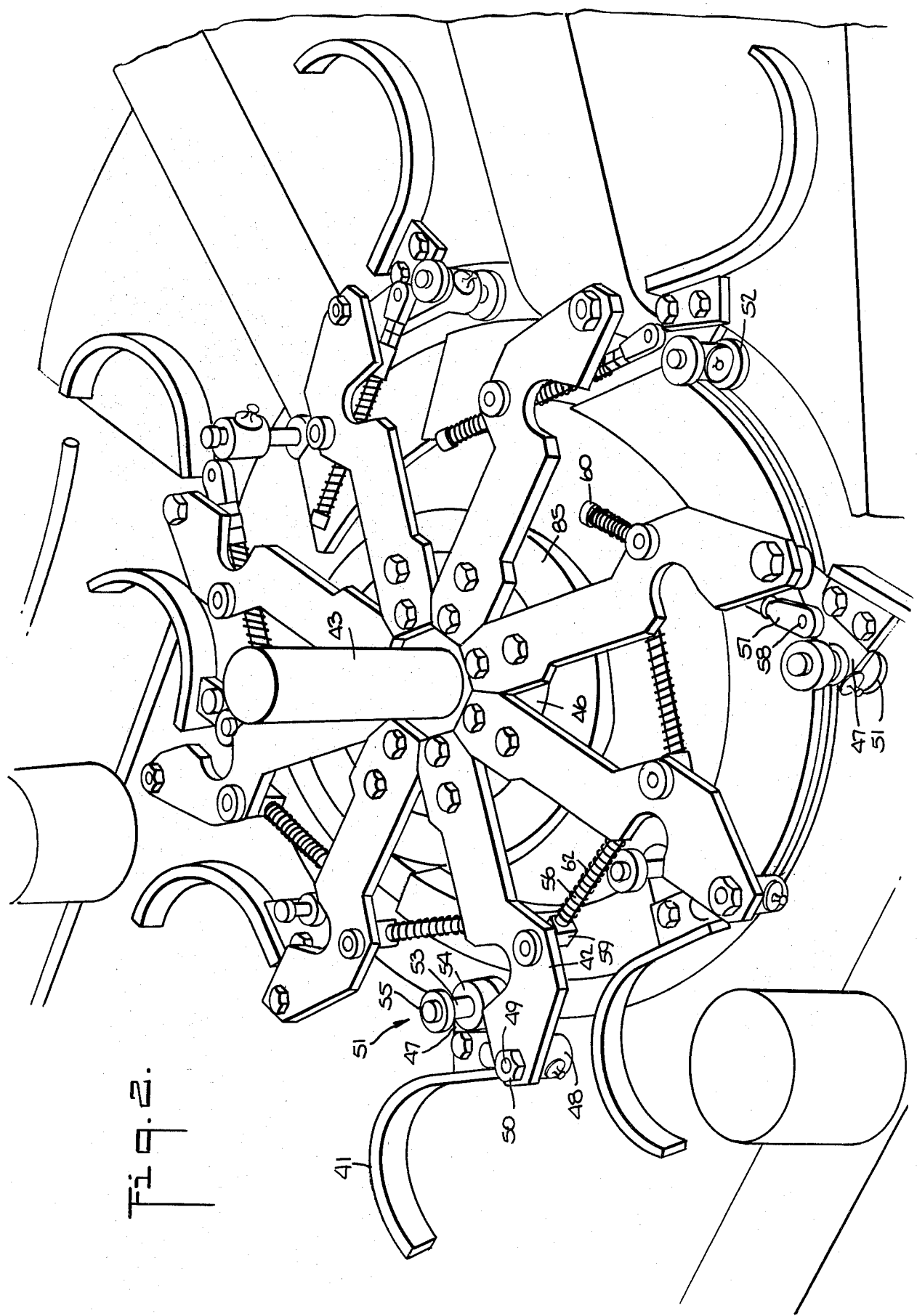

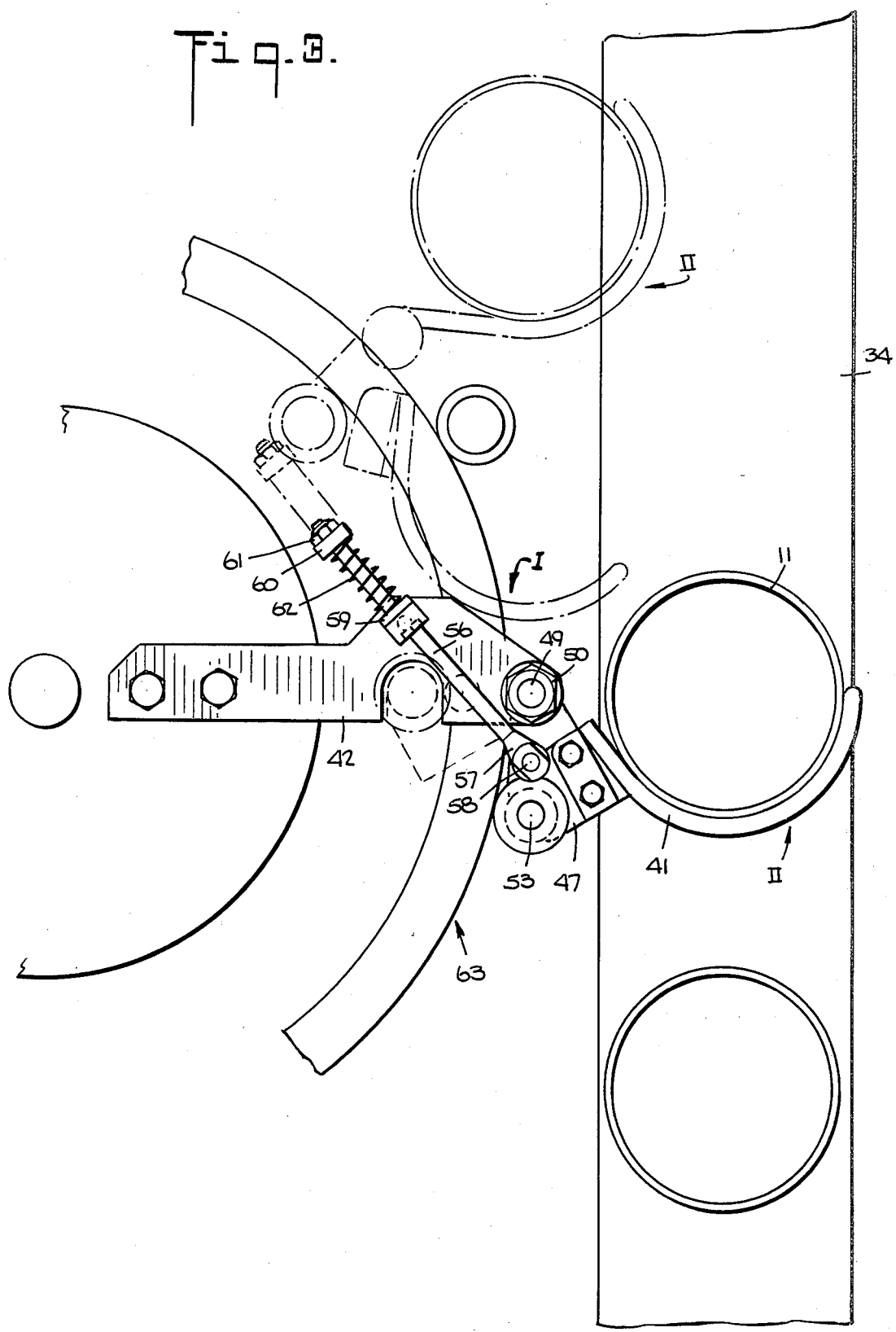

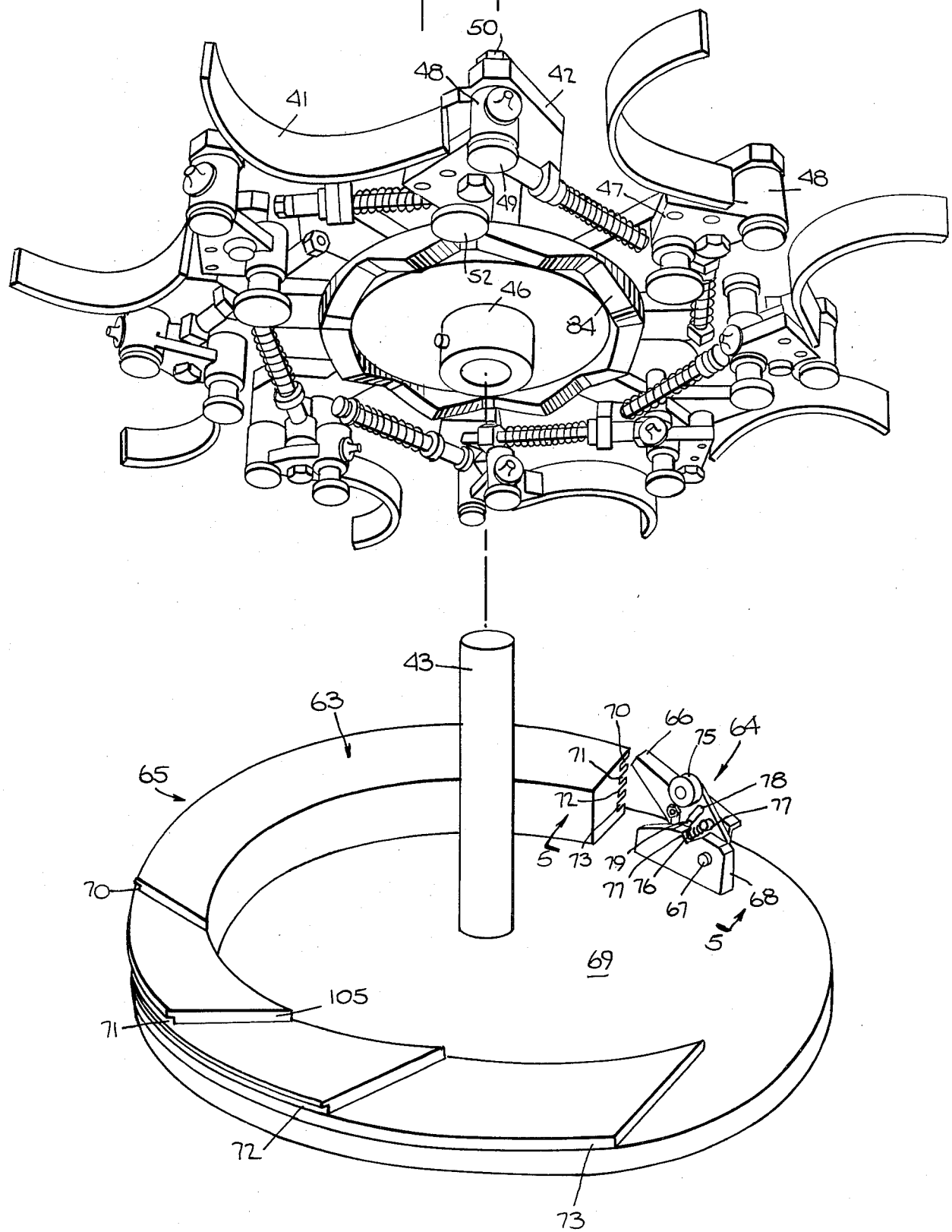

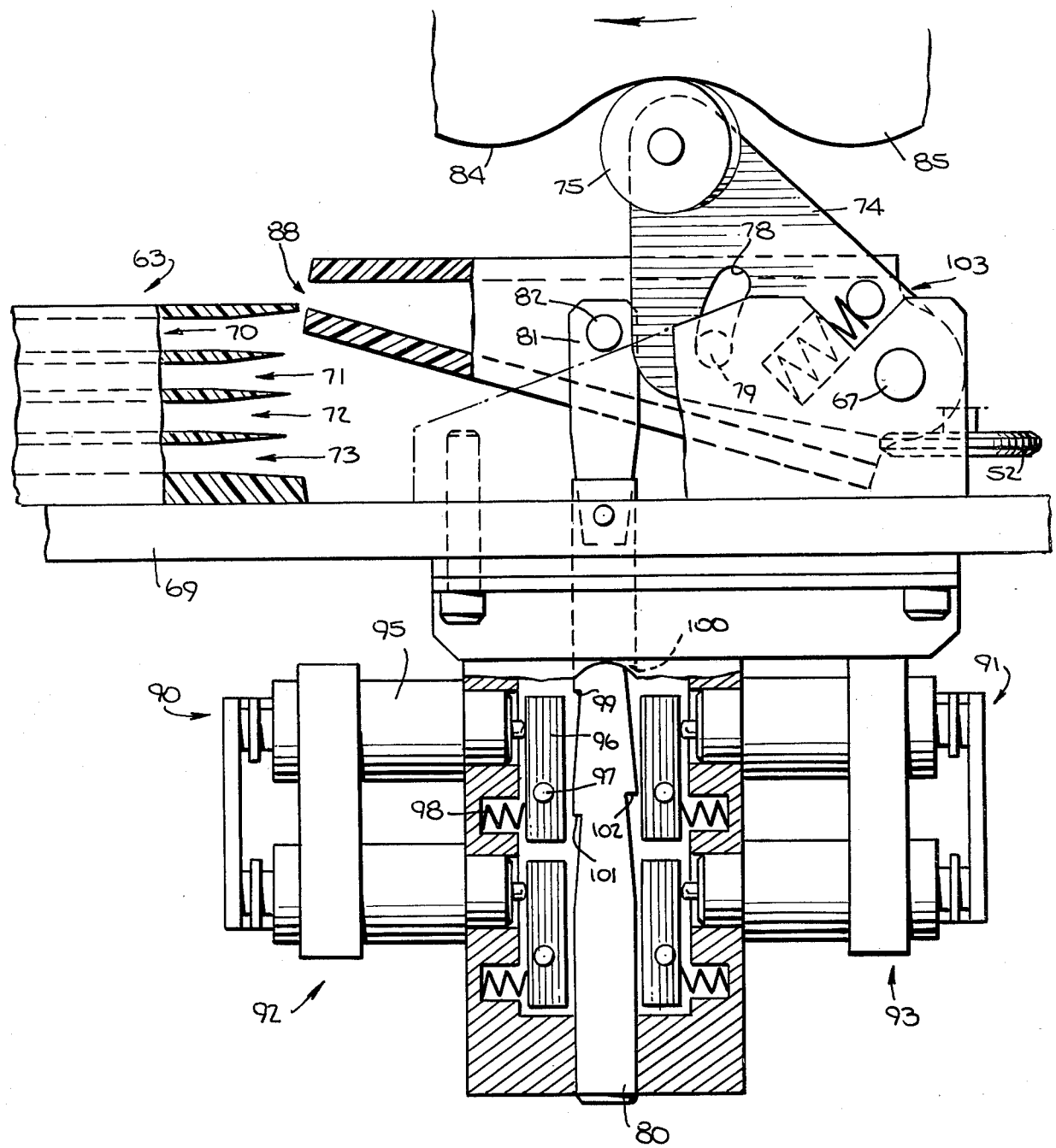

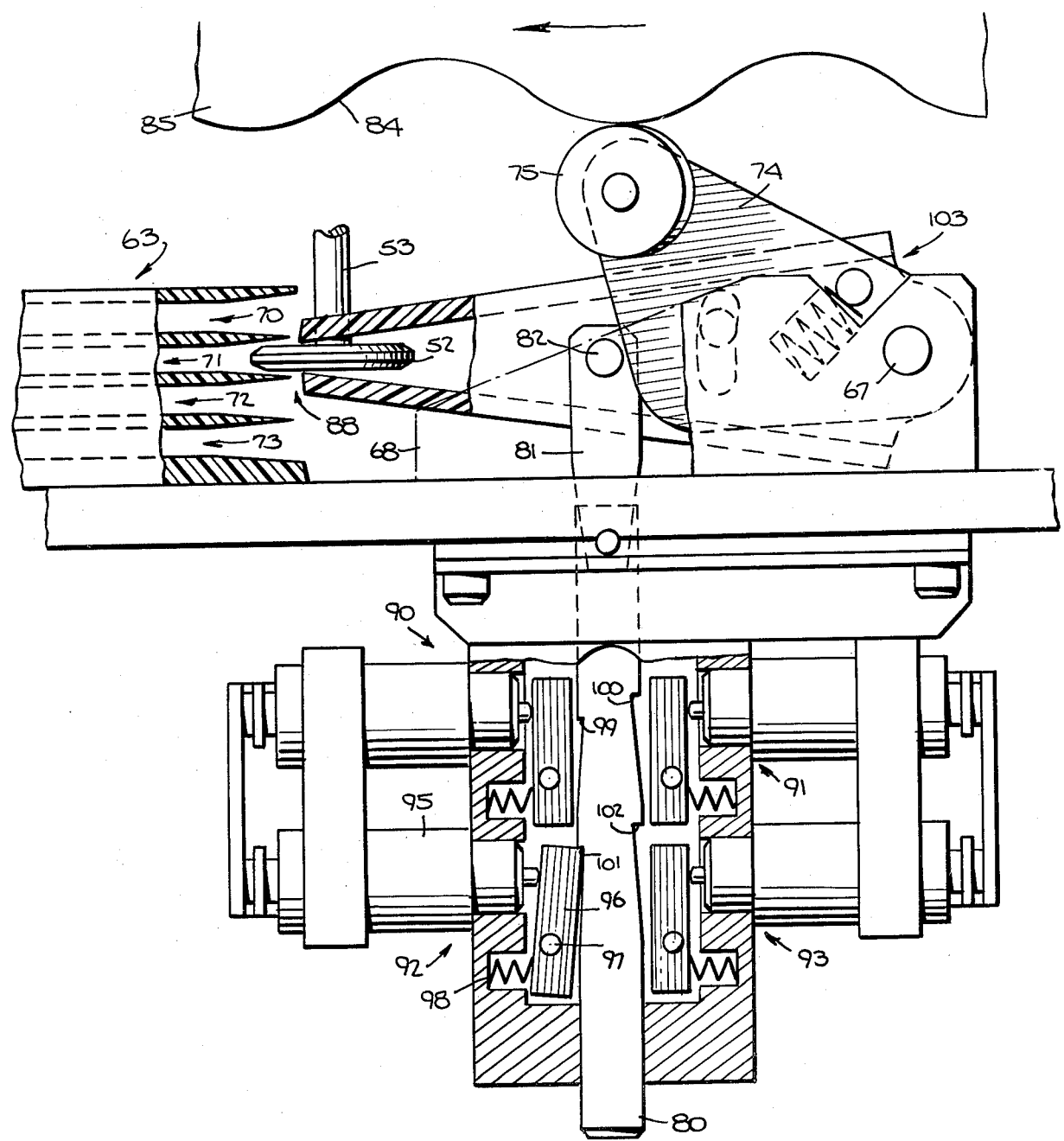

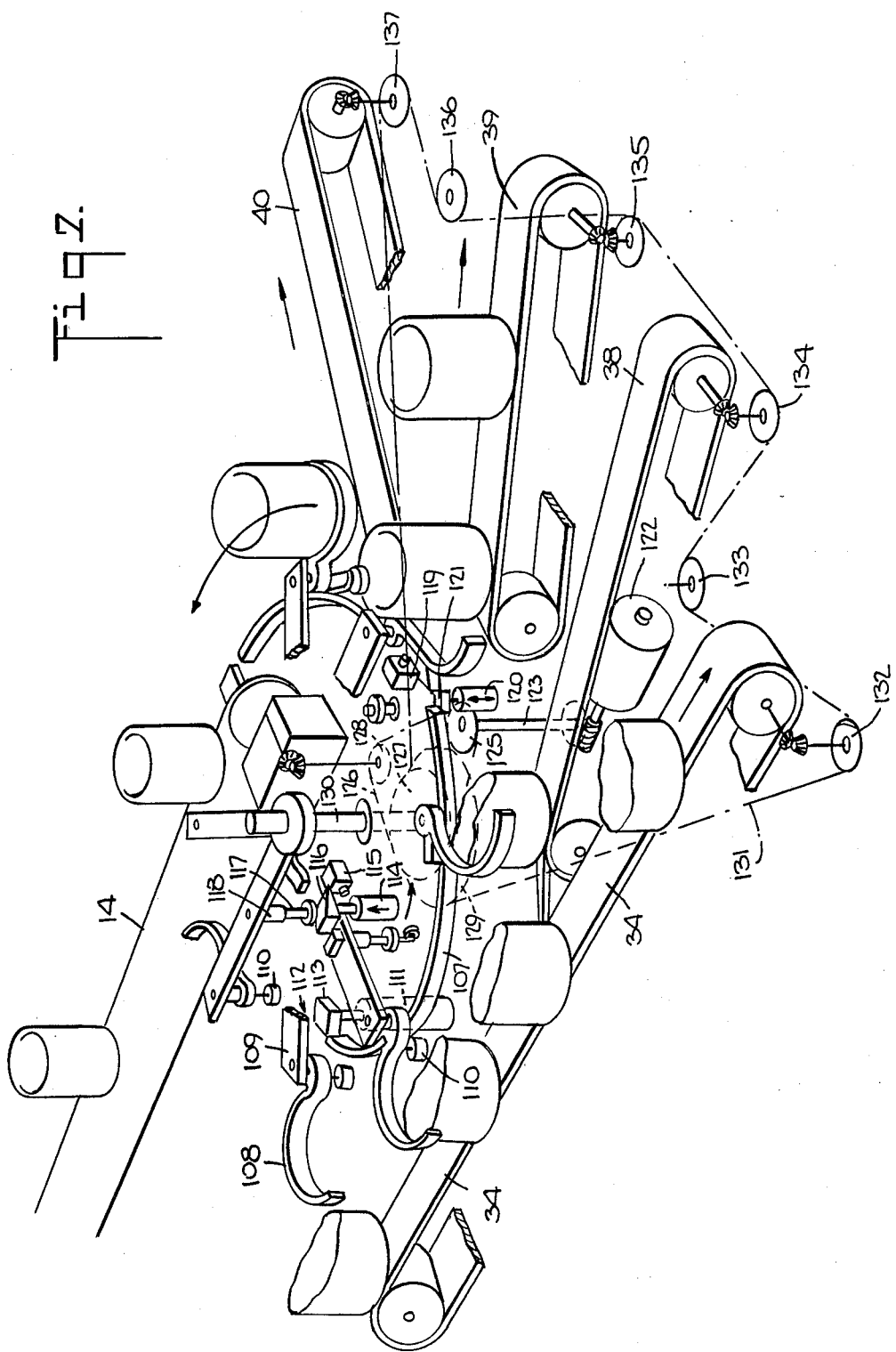

APPARATUS FOR DIVERTING ARTICLES

BACKGROUND OF THE INVENTION

The present invention relates to apparatus for diverting or switching articles and particularly to apparatus for diverting articles from a first conveyor to at least one additional conveyor if the value of a sensed characteristic of the article differs by more than a predetermined amount from a preselected value.

In many manufacturing activities it is desirable to divert or switch selected articles travelling in a line on one conveyor to one or more additional conveyors leading, for example, to similar processing stations operating in parallel, according to available capacity.

In other manufacturing activities the finished product is required to have a certain characteristic, such as weight, maintained within predetermined limits. For example, in the food industry a line of containers typically is transported on a conveyor past a filling station to be filled with food items. After filling, the containers continue to be transported by the conveyor past a sensing station where the value of a characteristic, such as weight or fill level, is determined. If the value of the characteristic falls outside a predetermined range, the container is diverted to another conveyor line, either for return to the filling station or for other remedial action to bring the measured characteristic within the desired limits. In the simplest case, all out-of-limits articles may be returned for refilling. In other cases, it may be desirable to treat out-of-limits articles differently, depending upon whether the sensed value is over or under the desired value and the amount by which the sensed value differs from the desired value.

For example, in packing some food items a certain amount of moisture or liquid is permitted in the packaged product. If a container is initially filled with items containing less moisture than the permitted maximum, it may be possible to remedy slight underfilling by adding corresponding amounts of liquid to the container. In such a situation it is desirable to be able to divert containers to any one of several additional conveyor lines. For example, one conveyor line can pass a station adapted to add one ounce of liquid to containers that were no more than one ounce underweight, another line can pass a station adapted to add two ounces of liquid to containers between one and two ounces underweight, and so on, and a final line can return a container for dumping and refilling if it is overweight, or more than a correctable amount underweight.

SUMMARY OF THE INVENTION

It is an object of the invention to selectively divert articles from one conveyor to one or more additional conveyors.

It is another object of the present invention to provide an apparatus for classifying articles into two or more groups based on differing values of a predetermined characteristic.

It is a further object of the invention to provide an apparatus for classifying articles which is particularly suited for diverting filled containers from a line of containers on a first conveyor to at least one additional conveyor if the weight of the container differs by a predetermined amount from a preselected value.

These and other objects of the invention are accomplished by an apparatus for diverting articles which are moved by a conveyor in a line extending along a predetermined path, the apparatus comprising a diverting station located adjacent the predetermined path; at least one additional conveyor for moving articles along at least one additional path diverted from said predetermined path and extending from said diverting station; means for generating a different diverting signal corresponding to each additional conveyor; and means responsive to each different diverting signal for selectively diverting an article from the conveyor extending along the predetermined path to the additional conveyor corresponding to its respective diverting signal when the article reaches the diverting station.

In a preferred embodiment of the apparatus the diverting means comprises a plurality of devices, each of which is adapted to engage a different article as it passes the diverting station on a first conveyor and for diverting the engaged article from the first conveyor; means for supporting the engaging devices in spaced relation to each other for movement along a closed path, the diverting station and each additional conveyor being located along said closed path; means for driving the supporting means in synchronism with the first conveyor such that an engaging device arrives at the diverting station simultaneously with the arrival of each article on the first conveyor; an enabling station located along said closed path ahead of the diverting station at a distance such that each engaging device can move from the enabling station to the diverting station as each article on the first conveyor moves to the diverting station; means at said enabling station for enabling an engaging device passing said enabling station, in response to a diverting signal from a diverting signal generating means, to be actuated for selectively engaging an article on the first conveyor at the diverting station to selectively divert the engaged article to at least one additional conveyor when the engaging device and the article meet at the diverting station; and means for actuating each enabled engaging device for diverting the corresponding article thereto when it arrives at the diverting station.

The engaging device preferably comprises an arm pivotally mounted on said support means for movement between a first position in which the arm will not contact the article at the diverting station and a second position in which the arm will engage the article to divert it from the first conveyor. The arm is spring biased toward the first position and carries a cam follower adapted to engage a cam track means extending from adjacent the enabling station to adjacent each additional conveyor. The enabling means operates to engage the cam follower with the cam track means upon a signal from the diverting signal generating means. If more than one additional conveyor is provided, the cam track means may be equipped with gates adjacent each additional conveyor for releasing the cam follower to allow the arm to return to the first position. Alternatively, separate and parallel cam tracks may be provided for each additional conveyor, in which case the enabling means operates to engage the cam follower of the corresponding arm with the proper cam track. The latter arrangement is preferred because the only active selecting mechanism is the enabling means.

The above and other objects and features of the invention will become clearer from the following description of the preferred embodiment in connection with the accompanying drawings.

BRIEF DESCRIPTION OF THE DRAWINGS

FIG. 2 is a perspective view in enlarged detail of the diverting means of the apparatus of FIG. 1.

FIG. 3 is a plan view of a portion of the diverting means of FIG. 2 showing the retracted and extended positions of a pivoted engaging arm.

FIG. 4 is an exploded view, in perspective, of the diverting means, showing the support for the engaging arms, the enabling means, and the cam track means.

FIG. 5 is an elevation view of the enabling means in partial section, taken in the direction of arrows 5—5 in FIG. 4, the view taken at the top of the stroke of the enabling means.

FIG. 6 is an elevation view of the enabling means in partial section, similar to FIG. 5, but with the enabling means at the bottom of its stroke.

FIG. 7 is a perspective view in schematic form of an alternative embodiment of the classifying apparatus.

DETAILED DESCRIPTION OF THE PREFERRED EMBODIMENT

Figure 1:
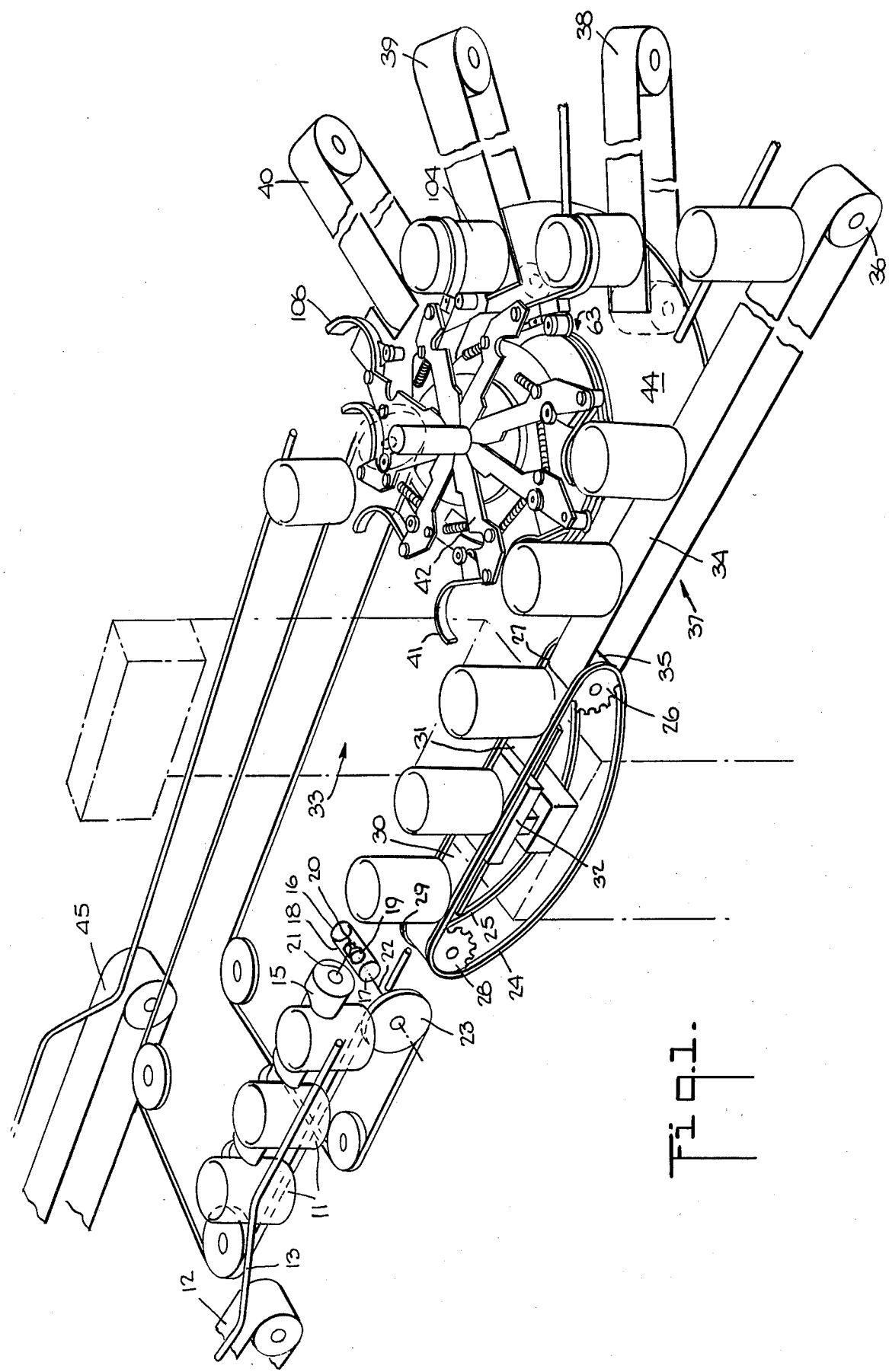
FIG. 1 is a perspective view in partially schematic form of an apparatus for diverting articles, according to the invention.

With reference to FIG. 1, the embodiment of the best mode presently known to the inventers of an apparatus 10 for diverting articles according to the invention receives articles, such as containers 11, from a conveyor belt 12, which may bring the containers from a conventional filling machine (not shown). A guide rail 13 transfers the containers laterally from belt 12 to a plastic-covered chain conveyor 14.

Feeding of the containers to the diverting apparatus is controlled by a lead screw 15 spirally grooved to fit the sides of the containers and made of a plastic such as polytetrafluoroethylene, or other suitable material. The containers are held against the lead screw by guide rail 12, and their spacing as they leave the screw is established by the final pitch of the groove, which may increase from entrance end to exit end if it is desired to separate containers that are close up at the entrance to the screw. The lead screw is driven in synchronism with chain conveyor 14 by any suitable means, such as by the schematically illustrated pulleys 16 and 17, drive belt 18, and bevel gears 19 and 20 coupling shaft 21 of the lead screw to shaft 22 of idler wheel 23 of the plastic-covered chain conveyor.

After leaving the exit end of lead screw 15, at regulated timing and spacing, the containers move onto another conveyor which, in the preferred mode, comprises two parallel flexible chains, such as timing or roller chains 24 and 25 that are looped over front drive sprockets 26 and 27 and rear idler sprockets 28 and 29. The chains slide over support plates 30 and 31, which are separated by a scale platform 32 at a sensing station 33. The chains are provided with substantial slack on the return to insure that there will be no variation in the measured weight due to changing tension in the chains. Platform 32 is part of a commercially available weighing unit which can be adjusted to provide a signal corresponding to the difference of the weight of each filled container from a preselected value as the container passes the sensing station. Although weight is the sensed characteristic in the illustrated embodiment, other characteristics, such as fill level, may be sensed, depending on the characteristic upon which classification of the articles is based.

After leaving the sensing station, the containers pass onto an extension 34 of conveyor 24/25, the extension being of the endless belt type and passing over a rear idler roller 35, coaxial with sprockets 26 and 27, and a front drive roller 36. This extension conveyor 34 passes a diverting station 37 spaced from the sensing station in the direction of movement of the conveyor. At the diverting station there is a means responsive to signals from the sensing station for selectively diverting containers from the first conveyor to any one of three additional conveyors 38, 39, 40, or to the return leg of chain conveyor 14, depending on the difference of the sensed container weight from a preselected value.

The diverting means comprises a number of engaging devices in the form of hooked arms 41, each of which is pivotally mounted at one end to a support means in the form of a radial member 42. The illustrated embodiment of the diverting means includes eight arms pivoted to eight radial support members. The support members are connected to a central axle 43 mounted for rotation about a vertical axis and driven in synchronism with the conveyor by a single drive motor and any suitable drive arrangement (not shown in FIG. 2, but as illustrated in FIG. 7).

The pivoted arms 41 are adapted to swing from a first position in which they will not contact the containers as the containers pass the diverting station to a second position in which they engage the containers and slide them off the conveyor 34 onto a circular deadplate 44. Depending on the value of the signal from the sensing station, the arms are released at a predetermined one of the three additional belt type conveyors 38, 39, and 40, or the container may be carried around to a continuation of the plastic-covered chain conveyor 14 for return to the filling area on yet another conveyor 45.

Referring next to FIGS. 2 and 3, the diverting means is shown in more detail. It will be seen that the radial support arms 42 are bolted to a hub 46, the hub having a central hole that allows it to slide onto axle 43. Each of the engaging arms is bolted onto a fitting 47 that includes a bushing 48 that is rotatably mounted on an arbor 49, and the arbor is fastened to the respective support arm by a nut 50. Fitting 47 also carries a cam follower means 51 that comprises a follower wheel 52 mounted on the lower end of a rod 53 that is slidably and rotatably supported in a bushing 54. A collar 55 fastened to the upper end of the rod with set screws (not shown) acts as a stop to prevent the rod from dropping through the bushing and to adjust the height of the cam follower wheel relative to the support assembly.

Also connected to the fitting is a spring biasing means comprising a rod 56 having a clevis 57 at one end that is pivotally attached to the fitting by a pin 58. The rod extends slidably through a hole in an angle bracket 59 fastened to the underside of the respective support arm and has a stop collar 60 at the other end secured by a nut 61. A coil compression spring 62 between the stop collar and the bracket 59 urges the engaging arm to pivot to a retracted first position I as shown in FIG. 3.

Each arm can be selectively enabled by an enabling means to move outward to an extended position II (see FIG. 3) by an actuating means in the form of a cam track means 63. The manner of operation of the enabling means and the actuating means can be best understood by referring to FIG. 4 in connection with FIG. 3.

In FIG. 4, the support assembly has been lifted off axle 43 to provide a clear view of enabling means 64 and actuating means 65. The enabling means comprises a triangular shaped guide means or guide channel 66 that is pivotally mounted by a pin 67 to a vertical support plate 68 that is bolted to table 69. The radial distance of the bottom of outwardly facing guide channel 66 from the axis of axle 43 is equal to the radius of a circle tangent to the inner circumference of each cam follower wheel 52 when its respective engaging arm is in the retracted first position.

The pivoted guide channel 66 is actuated, by means which will be described in detail below, to selectively guide the follower wheel of the cam follower means of each engaging arm in succession either to ride on top of cam track means 63 or, alternatively, to enter a predetermined one of four parallel cam track channels 70, 71, 72, or 73. If the respective follower wheel is guided to ride on top of the cam track means, its respective arm remains biased into the retracted position by the spring biasing means pivotally described. On the other hand, if the follower wheel is guided into any one of the cam track channels, the wheel is moved spirally outward as the support assembly rotates with axle 43 to reach a radial position in which the engaging arm is fully extended to position II when its respective support arm is generally aligned with the center of the respective container to be diverted, as shown in FIG. 3.

Because the drive for axle 43 is synchronized with the conveyor drive, it is possible to position the enabling means at a circumferential point ahead of the diverting station such that the time for an engaging arm to travel from the enabling station to the diverting station is the same as the time for a container to travel from the sensing station to the diverting station. Preferably, the speed of the diverting means is synchronized so that the linear velocity of a point on each arm that falls vertically above the center line of conveyor 34 when the arm is in the extended position is equal to the linear velocity of conveyor 34. Consequently, the circumferential distance of the enabling means to the diverting station will be approximately equal to the distance of the sensing station to the diverting station. In this way, signals from the sensing station can be used simultaneously to actuate the enabling means without the need for any electronic delay system.

The operation of the enabling means will next be explained with reference to FIGS. 4, 5 and 6. As previously mentioned, guide channel 66 is pivotally mounted to a vertical support member 68 by a pin 67. Between the inner face of guide channel 66 and the outer face of support member 68 is an intermediate actuator plate 74, also pivotally mounted on pin 67. Actuator plate 74 carries a cam follower wheel 75 and is biased upward by a compression spring 76 which has its lower end bearing against the bottom of a slot 77 in vertical support plate 68 and its upper end bearing against a stop pin 77 fixed to the actuator plate. The actuator plate is also coupled to guide channel 66 by a lost motion or override coupling comprising an arcuate groove 78 in the actuator plate and a stop pin 79 fixed to the guide channel and freely movable from the upper end to the lower end of the groove. Normally guide channel 66 will be biased downward by the weight of a latching bar 80 which is suspended from the channel by a link member 81 and two pivot pins 82 and 83; so that stop pin 79 will bear against the bottom of arcuate groove 78 (as shown in FIG. 5).

The cam follower wheel 75 at the top of the actuator plate is adapted to bear against a downward-facing cam surface 84 of a cam ring 85 (see FIG. 4) that is attached to the underside of the support arms by means (not shown), such as screws and arcuate slots, that permit a limited amount of angular adjustment of the cam ring with respect to the engaging arm support assembly. Cam surface 84 undulates between upper points 86 and lower points 87, with one cycle corresponding to each arm 41. The vertical distance between the upper and lower points on the cam is such as to cause exit end 88 of guide channel 66 to "scan" vertically from just above the top of cam track means 63 (see FIG. 5) down to the bottom cam track channel 73. As the support assembly rotates, therefore, the guide channel will perform one complete vertical "scanning" cycle with respect to each engaging arm, assuming no signal is transmitted from the sensing station.

In order for the enabling means to be able to select between the five alternatives of the four cam track channels plus the top of the cam track means, it is provided with a four-position mechanism 89. The mechanism includes four latch assemblies 90, 91, 92, and 93, mounted in a housing 94. Each latch assembly comprises a solenoid actuator 95, a latching pawl 96 pivotaly mounted on a pin 97 and biased toward the disengaged position by a compression spring 98. Each of latch assemblies 90, 91, 92, and 93 is adapted to engage a corresponding notch 99, 100, 101, and 102 on latching bar 80 such that the enabling means can respectively select the top surface of the cam track means, cam channel 70, channel 71, or channel 72, depending on which of assemblies 90, 91, 92, or 93 is energized.

As an example, the manner of selecting channel 71 is illustrated successively in FIGS. 5 and 6. In FIG. 5, the cam follower wheel 75 is at a high point of undulating cam surface 84, and a cam follower wheel 52 of a corresponding engaging arm 41 is just entering entrance end 103 of guide channel 66. It should be noted that the height of cam follower wheel 52 is adjusted (by means of collar 55 on rod 53, as previously described) to be at the level of the lowest cam track channel 73.

Approximately coincident with the arrival of actuator plate cam follower wheel 75 at the high point of the cam surface, as shown in FIG. 5, a container will arrive at the sensing station. The sensing system (in this case a weight measuring system) has four separate outputs, each output producing a signal corresponding to one of four different weight ranges, one of the signals representing a normal or acceptable weight and the other three representing successive degrees of underweight conditions, for example. The four outputs are connected to the respective solenoids of the four latch assemblies 90, 91, 92, and 93.

Assuming the particular container falls within the second degree of the underweight category, the sensing system will produce a signal from output three, thereby energizing the solenoid of latch assembly 92. This solenoid presses its pawl against the latching bar. Meanwhile, the support assembly rotates and carries cam ring 85 in the direction shown by the arrow, so that cam surface 84 starts to press down cam follower wheel 75. Actuator plate 74 pivots downward, and guide channel 66 follows until the pawl of energized latch assembly 92 engages its respective notch 101 on the latching bar. This stops the downward scan of the guide channel at the level where the exit end of the guide channel is opposite cam track channel 71. The actuator plate continues to pivot downward, however, until its cam follower wheel reaches the lowest point of cam surface 84, this movement relative to the guide channel being permitted by the pin-and-groove override coupling between the two elements. As shown in FIG. 6, at the moment the actuator plate cam follower wheel reaches the lowest point of the cam cycle, the cam follower wheel 52 of the corresponding engaging arm is just leaving the exit end of guide channel 66 and entering the second cam track channel 71.

Referring to FIGS. 1 and 4, it can be seen that this cam track channel extends to the second additional conveyor 39. Consequently, the cam follower wheel 52 entering this track will actuate its respective engaging arm to swing outward to position II (FIG. 3) by the time the arm reaches the diverting station. The arm then engages the corresponding container, which has concurrently arrived at the diverting station, and transfers the container in an arcuate path laterally off conveyor 34, along deadplate 44, over the first additional conveyor 38, and continuing along the deadplate until the container is on conveyor 39. This position is illustrated by container 104 in FIG. 1.

At this point, the cam follower wheel of the engaging arm is at the end of cam track channel 71. Further rotation of the support assembly causes the cam follower wheel to move radially inward along end face 105 (FIG. 4) of the cam track channel, thereby allowing the engaging arm to swing rearwardly and inwardly under the urging of its spring biasing device and to disengage from container 104. This permits the container to move outwardly on conveyor 39 and to clear the engaging arm as the support assembly continues its rotation.

It will be apparent from an inspection of FIGS. 1, 4 and 5 that signals energizing latch assemblies 91 and 93 will similarly cause the enabling means to select cam track channels 70 and 72, so that the corresponding engaging arms will be actuated to deliver containers to the first and third additional conveyors 38 and 40, respectively. On the other hand, if latch assembly 90 is energized by a signal from the first, or "acceptable" output of the sensing question, the enabling means will deliver the corresponding cam follower wheel 52 to the top of cam track means 63. As the support assembly rotates, the cam follower wheel 52 will slide along the top of the cam track means without being urged radially outward. Consequently, its engaging arm will remain retracted, and the corresponding container will not be engaged but will continue on conveyor 34 past the diverting station.

If no signal is received from the sensing station, which may indicate either no container or an uncorrectably underfilled or overfilled container, the enabling means makes a full downward scan and delivers the cam follower wheel 52 to the lowest cam track channel 73. This channel actuates the corresponding engaging arm for the full diversion path back to the return leg of conveyor line 14, at which point the arm retracts, allowing a diverted container, if any, to be sent back for refilling. If the lack of signal is caused by no container (i.e., a gap in the line of containers), the actuated engaging arm merely travels around the diversion path empty, as shown by arm 106 in FIG. 1.

With reference next to FIG. 7, an alternative embodiment of the enabling means and actuating means for the engaging arms is illustrated in a cutaway schematic form. This embodiment uses a single cam track ring 107 to actuate the engaging arms 108 for diverting containers to any of the three additional conveyors 38, 39, and 40, or return line 14, which correspond to the same numbered conveyors in FIG. 1.

Each engaging arm is pivotally connected to a radial support arm 109, in a manner similar to that of the embodiment of FIGS. 1-6, and is spring biased into a retracted position corresponding to position I of the previous embodiment. In the retracted position, a cam follower wheel 110 depending from each engaging arm follows a path which lies inside the inner circumference of cam ring 107.

The enabling means in this embodiment comprises an air cylinder or similar linear actuator 111 mounted adjacent to and inside the entrance end 112 of the cam ring. A curved deflection block 113 is attached to the actuator shaft of the air cylinder. Normally this block is positioned below the cam ring, clear of the path followed by the cam follower wheels of the retracted engaging arms. In response to a diverting signal, the air cylinder of the enabling means is actuated to position the deflection block in the path of an approaching cam follower wheel 110. The block diverts the wheel to the outside of cam ring 107, thereby urging the corresponding engaging arm outward into an extended position corresponding to position II of the previous embodiment.

At the same time, the diverting signal actuates an auxiliary air cylinder 114 and a latching mechanism 115 similar to the latching mechanism illustrated in FIGS. 5 and 6 of the previous embodiment. An inclined block 111 is mounted on the top of auxiliary air cylinder 114, and the block is raised to three different levels, depending on which one of three different signals is delivered to the latching mechanism. Mounted on the support arm of the corresponding engaging arm is a trip member that includes a vertical shaft 117 mounted in a bushing 118 for vertical movement in response to contacting the inclined block 116. The vertical shaft 117 has three detent positions corresponding to the three latch levels of the inclined block. Thus, the trip member can be set to any one of three different levels by the actuation of air cylinder 114 and its latching mechanism 115 in response to a corresponding one of three different diverting signals.

Depending on the set level of the trip member, when the corresponding support arm reaches a position opposite a selected one of the three additional conveyors, the trip member trips a switch 119 positioned at that set level to operate an air cylinder 120 located below the cam track ring. The air cylinder 120 carries a gate block 121 which normally permits the cam track follower wheels 110 to continue along the outside of the cam ring. Upon actuation of this air cylinder, however, the gate block is dropped down, thereby allowing the cam follower wheel to move inwardly through the gap and retract the contact arm at the selected conveyor.

From the foregoing, it can be seen that by properly selecting the latching height of air cylinder 114 a total of four trip member levels can be obtained (three levels corresponding to the three actuated levels of air cylinder 114 plus a fourth lowest level corresponding to no actuation). The lowest three of these four trip member levels correspond to the respective heights of the switches for actuating the three cam track gates. The fourth, and highest, trip member level will actuate none of the gates. In the last situation, a corresponding container will be carried around the diverting means to be released onto the return leg of conveyor 14.

The schematic diagram of FIG. 7 also illustrates a synchronized drive arrangement in which motor 122 drives a shaft 123 through a worm and gear 124. At the upper end of drive shaft 123 is a pulley 125 which drives the axle of the diverting means and the return leg of conveyor 14 through a belt 126 and pulleys 127 and 128. Another pulley 129 mounted on axle 130 drives conveyors 34, 38, 39, and 40 through a belt 131 and respective pulleys 132, 133, 134, 135, 136, and 137.

Although the foregoing description of the preferred embodiments has shown engaging means in the form of pivoted arms, it is possible to substitute other devices, for example vacuum pads, to perform the function of selectively diverting articles from one conveyor to one or more additional conveyors. In such an arrangement, suitable valves and actuating mechanisms for enabling and actuating such vacuum pads from a vacuum source can be provided by one skilled in the art, based on the foregoing teaching.

In addition, although the description of the preferred embodiment has been in connection with the classification of filled containers by weight, the apparatus and method of the invention are adapted broadly to any process in which articles are to be diverted from one conveyor to any of one or more additional conveyors. For example, such diversion might be called for in a production line where a high rate station is followed by two or more low rate stations, with the diverting means being actuated to shift articles from a line experiencing delays or possibly a breakdown to another line with available capacity.

Other variations and embodiments of the invention will be apparent to those skilled in the art without departing from the scope of the invention as disclosed.

We claim:

1. An apparatus for diverting articles from a conveyor moving said articles in a line along a predetermined path, the apparatus comprising:
   a diverting station located adjacent the predetermined path;
   at least one additional conveyor for moving articles along at least one additional path diverted from said predetermined path and extending from said diverting station;
   means for generating a different diverting signal corresponding to each additional conveyor;
   a plurality of devices, each of which is adapted to engage a different article as it passes the diverting station for diverting the engaged article from the first conveyor;
   means for supporting the engaging devices in spaced relation to each other for movement along a closed path, the diverting station and the at least one additional conveyor being located along said closed path;
   means for driving the supporting means in synchronism with the conveyor extending in a predetermined path in order that an engaging device arrives at the diverting station simultaneously with the arrival of each article on the conveyor;
   enabling means at an enabling station located along said closed path at a predetermined distance ahead of the diverting station and responsive to a diverting signal from the diverting signal generating means for enabling an engaging device as the device passes said enabling station to be actuated for selectively engaging an article on the conveyor when the engaging device and the article meet at the diverting station to selectively divert the engaged article to one additional conveyor corresponding to said diverting signal;
   means for actuating each enabled engaging device to divert the article corresponding thereto at the diverting station; and
   means for releasing said article from said engaging device at the additional conveyor corresponding to the diverting signal, wherein
   each engaging device comprises an arm pivotally mounted on said support means for movement between a first position in which the arm is free of engagement with the article at the diverting station and a second position in which the arm can engage the article to divert it from the conveyor, and wherein
   said enabling means comprises means for biasing each arm toward the first position; a cam track extending from adjacent the enabling station to adjacent the additional conveyor; and a cam track follower means attached to each arm, the follower means when in contact with the cam track pivoting the arm to said second position between the diverting station and the additional conveyor.

2. An apparatus according to claim 1 wherein the diverting signal generating means comprises means for sensing a predetermined characteristic of each article, said sensing means being located at a sensing station adjacent said predetermined path at a distance ahead of the diverting station such that the time for an article to move from the sensing station to the diverting station is equal to the time for a corresponding engaging device to move from the enabling station to the diverting station.

3. An apparatus according to claim 1 wherein the support means comprises a structure mounted for rotation about a vertical axis, and the arms are mounted on said structure at equal radial distances from said axis and at equal angular spacing about said axis.

4. An apparatus according to claim 3 wherein the articles to be diverted are cylindrical containers, and the arms are curved to fit the walls of the containers.

5. An apparatus according to claim 1 wherein said engaging device further comprises means for biasing each arm toward the first position and cam follower means attached to each arm; the actuator means comprises a cam track means extending from adjacent the enabling station to adjacent each additional conveyor; and the enabling means comprises a device for selectively engaging the cam follower means of an arm with the cam track means in response to a signal from the signal generating means, the cam track means engaging the cam follower means to pivot the arm to the second position as the arm moves from the enabling station to the diverting station.

6. An apparatus according to claim 5 wherein the at least one additional conveyor comprises a plurality of additional conveyors spaced along and diverging from said closed path and wherein the cam track means comprises an equal plurality of parallel cam tracks, each cam track extending to adjacent a corresponding one of the additional conveyors.

7. An apparatus according to claim 6 wherein the enabling means comprises:
   a cam follower guide means located at the enabling station adjacent the cam track means, the guide means having an entrance end and an exit end and being pivoted about an axis adjacent to the entrance end for reciprocal rotation within an angle such that the exit end can be positioned opposite the entrance to each one of the plurality of cam tracks;

means for reciprocally rotating the guide means within said angle in synchronism with the movement of each arm past the enabling station; and means for stopping the exit end of the guide means opposite a selected one of the cam tracks in response to a corresponding signal from the diverting signal generating means.

8. An apparatus according to claim 7 wherein the means for reciprocally rotating the guide means comprises:

an actuator means mounted for reciprocal rotation about the pivot axis of the guide means;

an override means coupling the actuator means to the guide means;

a cam follower means mounted on the actuator means;

a cam means attached to the engaging arm supporting means and having a cam surface engageable by the cam follower means on the actuator means, the contour of said cam surface causing said actuator means to reciprocally rotate through said angle for one cycle in synchronism with the movement of each engaging arm past the enabling station.

9. An apparatus according to claim 8 wherein the means for stopping the exit end of the guide means opposite a selected cam track comprises a latching means having a plurality of latching positions.

10. An apparatus according to claim 9 wherein the number of latching positions of the latching means is equal to the number of cam tracks.

* * * * *

UNITED STATES PATENT AND TRADEMARK OFFICE
CERTIFICATE OF CORRECTION

PATENT NO. : 4,239,116
DATED : December 16, 1980
INVENTOR(S) : Bernard C. Eisenberg and John C. Walz It is certified that error appears in the above—identified patent and that said Letters Patent are hereby corrected as shown below:

Column 5, line 18, delete "pivotally" and insert --previously--

Column 6, line 19, before "mechanism" in the first instance, insert --latching--

Signed and Sealed this

Seventh Day of April 1981

[SEAL]

Attest:

RENE D. TEGTMEYER

Attesting Officer    Acting Commissioner of Patents and Trademarks